United States Patent
Li et al.

(10) Patent No.: US 10,355,350 B2
(45) Date of Patent: *Jul. 16, 2019

(54) REMOTE ELECTRICAL TILE UNIT, BASE STATION, AND METHOD FOR MANAGING REMOTE ELECTRICAL TILT ANTENNA

(71) Applicant: Huawei Technologies Co., Ltd., Shenzhen, Guangdong (CN)

(72) Inventors: Yue Li, Xi'an (CN); Lixin Jiang, Shenzhen (CN); Wei Jiang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/885,475

(22) Filed: Jan. 31, 2018

(65) Prior Publication Data
US 2018/0159218 A1    Jun. 7, 2018

Related U.S. Application Data

(63) Continuation of application No. 15/261,370, filed on Sep. 9, 2016, now Pat. No. 9,917,360, which is a (Continued)

(51) Int. Cl.
*H04B 7/14*    (2006.01)
*H01Q 3/00*    (2006.01)
(Continued)

(52) U.S. Cl.
CPC ............ *H01Q 3/005* (2013.01); *G08C 17/02* (2013.01); *H01Q 1/246* (2013.01); *G08C 2201/60* (2013.01); *H04W 24/02* (2013.01)

(58) Field of Classification Search
CPC ............ H01Q 3/005; H01Q 3/01; H01Q 3/26; H04W 24/02
(Continued)

(56) References Cited

U.S. PATENT DOCUMENTS 6,239,744 B1 *   5/2001   Singer ................... H01Q 1/246
                                                              342/359
8,130,161 B2     3/2012   Arvidsson et al.
(Continued)

FOREIGN PATENT DOCUMENTS

CN    1852044 A     10/2006
CN    101035328 A    9/2007
(Continued)

OTHER PUBLICATIONS

Dai et al.; "Remote control of base station antenna systems based on two-dimensional electrically adjustable technology"; 2012 7th International ICST Conference on Communications and Networking in China (CHINACOM); Kun Ming, China; Aug. 8-10, 2012; 6 pages.

*Primary Examiner* — Sonny Trinh

(57) ABSTRACT

Embodiments of the present invention provide a remote electrical tilt unit, a base station, and a method for managing a remote electrical tilt antenna. The method includes: receiving, by the remote electrical tilt unit, permission configuration information sent by a first base station through a group of AISG ports of the remote control unit; configuring management permission of the first base station on the remote electrical tilt unit according to the permission configuration information, where the management permission includes at least control permission and query permission, and control permission on the remote electrical tilt unit can be allocated to only one base station. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

9 Claims, 5 Drawing Sheets

Related U.S. Application Data continuation of application No. PCT/CN2014/073128, filed on Mar. 10, 2014.

(51) Int. Cl.
  *H01Q 1/24* (2006.01)
  *G08C 17/02* (2006.01)
  *H04W 24/02* (2009.01)

(58) Field of Classification Search
  USPC .......................... 455/25, 63.4, 562.1, 575.7
  See application file for complete search history.

(56) References Cited

U.S. PATENT DOCUMENTS

| | | |
|---|---|---|
| 8,164,520 B2 | 4/2012 | Raeder et al. |
| 8,299,962 B2 | 10/2012 | Le Sage |
| 8,688,033 B2 | 4/2014 | Seeor et al. |
| 9,419,833 B2 | 8/2016 | Wang et al. |
| 9,502,764 B2 | 11/2016 | Au |
| 9,699,672 B2 | 7/2017 | Shen et al. |
| 9,735,468 B2 | 8/2017 | Xu et al. |
| 9,899,735 B2 * | 2/2018 | Jiang ................... H01Q 1/246 |
| 2001/0033247 A1 | 10/2001 | Singer et al. |
| 2004/0252055 A1 | 12/2004 | Thomas et al. |
| 2010/0201591 A1 | 8/2010 | Girard et al. |
| 2011/0096687 A1 | 4/2011 | Dottling et al. |
| 2011/0105099 A1 | 5/2011 | Roll |
| 2016/0141752 A1 | 5/2016 | Xu et al. |
| 2017/0078892 A1 | 3/2017 | Shen et al. |
| 2017/0365921 A1 * | 12/2017 | Webb ................... H01Q 3/005 |

FOREIGN PATENT DOCUMENTS

| | | |
|---|---|---|
| CN | 101827375 A | 9/2010 |
| CN | 102456948 A | 5/2012 |
| CN | 102780090 A | 11/2012 |
| CN | 103414020 A | 11/2013 |
| EP | 101827375 A | 9/2010 |
| EP | 2521394 A1 | 11/2012 |
| EP | 3016205 A1 | 5/2016 |

\* cited by examiner

REMOTE ELECTRICAL TILE UNIT, BASE STATION, AND METHOD FOR MANAGING REMOTE ELECTRICAL TILT ANTENNA

CROSS-REFERENCE TO RELATED APPLICATIONS

This application is a continuation of U.S. patent application Ser. No. 15/261,370, filed on Sep. 9, 2016, which is a continuation of International Application No. PCT/CN2014/073128, filed on Mar. 10, 2014. All of the afore-mentioned patent applications are hereby incorporated by reference in their entireties.

TECHNICAL FIELD

Embodiments of the present invention relate to communications technologies, and in particular, to a remote electrical tilt unit, a base station, and a method for managing a remote electrical tilt antenna.

BACKGROUND

A remote electrical tilt unit is built in an antenna, and during installation, a mapping relationship between the antenna and the remote electrical tilt unit does not need to be recorded, which simplifies a configuration process of the antenna and a remote electrical tilt device, and makes the installation of the antenna and the remote electrical tilt device more convenient and efficient. If it is required to use multiple frequency bands to cover a same area, an operator commonly uses a multi-band antenna to replace a single-band antenna. The multi-band antenna has advantages such as avoiding multiple times of antenna installation and saving occupied space. Therefore, building a remote electrical tilt unit in a multi-band antenna becomes a development trend of an antenna. However, when multiple base stations share a multi-band remote electrical tilt antenna, abase station needs to support management of multiple multi-band remote electrical tilt antennas.

Generally, communication between abase station and an antenna is implemented based on the Antenna Interface Standards Group (AISG) standard. Multiple base stations are connected to different AISG ports of the antenna to perform configuration management on a remote electrical tilt antenna. A remote electrical tilt unit (RET) can be configured by only one base station corresponding to an AISG port. In the prior art, however, it is difficult to locate and troubleshoot a fault in a scenario of incorrect configuration of the RET.

SUMMARY

Embodiments of the present invention provide a remote electrical tilt unit, a base station, and a method for managing a remote electrical tilt antenna, to implement joint management by multiple base stations on a RET in a remote electrical tilt antenna, and resolve a problem that it is difficult to locate and troubleshoot a fault when configuration of the RET is incorrect.

According to a first aspect, an embodiment of the present invention provides a remote electrical tilt unit, where the remote electrical tilt unit is connected to at least one base station through a group of Antenna Interface Standards Group AISG ports of a remote control unit and includes:

a receiving module, configured to receive permission configuration information sent by a first base station through a group of AISG ports of the remote control unit; and a configuration module, configured to configure, according to the permission configuration information, management permission of the first base station on the remote electrical tilt unit, where the management permission includes at least control permission and query permission, and control permission on the remote electrical tilt unit can be allocated to only one base station.

In a first possible implementation manner of the first aspect, when the permission configuration information includes control permission configuration information, the receiving module is specifically configured to receive first control permission configuration information sent by the first base station through the group of AISG ports of the remote control unit; and the configuration module is specifically configured to notify the first base station of a control permission conflict if the control permission on the remote electrical tilt unit is allocated to one base station, or allocate the control permission on the remote electrical tilt unit to the first base station if the control permission on the remote electrical tilt unit is not allocated to any base station.

In a second possible implementation manner of the first aspect, when the permission configuration information includes query permission configuration information, the receiving module is specifically configured to receive the query permission configuration information sent by the first base station through the group of AISG ports of the remote control unit; and the configuration module is specifically configured to configure the query permission of the first base station on the remote electrical tilt unit according to the query permission configuration information.

With reference to the first aspect to the second possible implementation manner of the first aspect, in a third possible implementation manner of the first aspect, when the permission configuration information includes control permission change information, the receiving module is specifically configured to receive the control permission change information sent by the first base station through the group of AISG ports of the remote control unit; and the configuration module is further configured to: if the control permission on the remote electrical tilt unit is allocated to the first base station, allocate the control permission of the first base station on the remote electrical tilt unit to a second base station according to the control permission change information, and change the control permission of the first base station on the remote electrical tilt unit to the query permission according to the control permission change information.

With reference to the first aspect to the third possible implementation manner of the first aspect, in a fourth possible implementation manner of the first aspect, when the permission configuration information includes control permission release information, the receiving module is specifically configured to receive the control permission release information sent by the first base station through the group of AISG ports of the remote control unit; and the configuration module is further configured to: if the control permission on the remote electrical tilt unit is allocated to the first base station, change the control permission of the first base station on the remote electrical tilt unit to the query permission according to the control permission release information.

With reference to the first aspect to the fourth possible implementation manner of the first aspect, in a fifth possible implementation manner of the first aspect, the permission configuration information is specifically an interface command or a permission configuration file.

According to a second aspect, an embodiment of the present invention provides a base station, including:

a connection module, configured to connect to a group of Antenna Interface Standards Group AISG ports of a remote control unit, where the AISG ports provide a connection to at least one remote electrical tilt unit; and a sending module, configured to send, through the AISG ports, permission configuration information to the at least one remote electrical tilt unit, where the permission configuration information is used to configure management permission of the base station on the remote electrical tilt unit, and the management permission includes at least control permission and query permission.

In a first possible implementation manner of the second aspect, when the permission configuration information includes control permission configuration information, the sending module is specifically configured to send first control permission configuration information to the at least one remote electrical tilt unit, where the first control permission configuration information is used to configure the control permission of the base station on the at least one remote electrical tilt unit.

In a second possible implementation manner of the second aspect, when the permission configuration information includes query permission configuration information, the sending module is specifically configured to send the query permission configuration information to the at least one remote electrical tilt unit, where the query permission configuration information is used to configure the query permission of the base station on the at least one remote electrical tilt unit.

With reference to the first aspect to the second possible implementation manner of the second aspect, in a third possible implementation manner of the second aspect, when the permission configuration information includes control permission change information, the sending module is further configured to: if control permission on a first remote electrical tilt unit is allocated to the base station, send the control permission change information to the first remote electrical tilt unit, where the control permission change information is used to allocate the control permission of the base station on the first remote electrical tilt unit to a second base station, and change the control permission of the base station on the remote electrical tilt unit to the query permission.

With reference to the first aspect to the second possible implementation manner of the second aspect, in a fourth possible implementation manner of the second aspect, when the permission configuration information includes control permission release information, the sending module is further configured to: if control permission on a first remote electrical tilt unit is allocated to the base station, send the control permission release information to the first remote electrical tilt unit, where the control permission release information is used to change the control permission of the base station on the first remote electrical tilt unit to the query permission.

With reference to the first aspect to the fourth possible implementation manner of the second aspect, in a fifth possible implementation manner of the second aspect, the permission configuration information is specifically an interface command or a permission configuration file.

According to a third aspect, an embodiment of the present invention provides a method for managing a remote electrical tilt antenna, where a remote electrical tilt unit is connected to at least one base station through a group of Antenna Interface Standards Group AISG ports of a remote control unit, and the method includes:

receiving, by the remote electrical tilt unit, permission configuration information sent by a first base station through a group of AISG ports of the remote control unit; and configuring, by the remote electrical tilt unit, management permission of the first base station on the remote electrical tilt unit according to the permission configuration information, where the management permission includes at least control permission and query permission, and control permission on the remote electrical tilt unit can be allocated to only one base station.

In a first possible implementation manner of the third aspect, when the permission configuration information includes control permission configuration information, the receiving, by the remote electrical tilt unit, permission configuration information sent by a first base station through a group of AISG ports of the remote control unit includes:

receiving, by the remote electrical tilt unit, first control permission configuration information sent by the first base station through the group of AISG ports of the remote control unit; and notifying the first base station of a control permission conflict if the control permission on the remote electrical tilt unit is allocated to one base station, or allocating the management permission on the remote electrical tilt unit to the first base station if the control permission on the remote electrical tilt unit is not allocated to any base station.

In a second possible implementation manner of the third aspect, when the permission configuration information includes query permission configuration information, the receiving, by the remote electrical tilt unit, permission configuration information sent by a first base station through a group of AISG ports of the remote control unit includes:

configuring, by the remote electrical tilt unit, the query permission of the first base station on the remote electrical tilt unit according to the query permission configuration information.

With reference to the first aspect to the second possible implementation manner of the third aspect, in a third possible implementation manner of the third aspect, when the permission configuration information includes control permission change information, the configuring, by the remote electrical tilt unit, management permission of the first base station on the remote electrical tilt unit according to the permission configuration information includes:

if the control permission on the remote electrical tilt unit is allocated to the first base station, allocating, by the remote electrical tilt unit, the control permission of the first base station on the remote electrical tilt unit to a second base station, and changing the control permission of the first base station on the remote electrical tilt unit to the query permission according to the control permission change information.

With reference to the first aspect to the third possible implementation manner of the third aspect, in a fourth possible implementation manner of the third aspect, when the permission configuration information includes control permission release information, the configuring, by the remote electrical tilt unit, management permission of the first base station on the remote electrical tilt unit according to the permission configuration information includes:

if the control permission on the remote electrical tilt unit is allocated to the first base station, changing, by the remote electrical tilt unit, the control permission of the first base station on the remote electrical tilt unit to the query permission according to the control permission release information.

With reference to the first aspect to the fourth possible implementation manner of the third aspect, in a fifth possible implementation manner of the third aspect, the permission configuration information is specifically an interface command or a permission configuration file.

According to a fourth aspect, an embodiment of the present invention provides a method for managing a remote electrical tilt antenna, including:

connecting a first base station to a group of Antenna Interface Standards Group AISG ports of a remote control unit, where the AISG ports provide a connection to at least one remote electrical tilt unit; and sending, by the first base station through the AISG ports, permission configuration information to the at least one remote electrical tilt unit, where the permission configuration information is used to configure management permission of the first base station on the remote electrical tilt unit, and the management permission includes at least control permission and query permission.

In a first possible implementation manner of the fourth aspect, when the permission configuration information includes control permission configuration information, the sending, by the first base station, permission configuration information to the at least one remote electrical tilt unit includes:

sending, by the first base station, first control permission configuration information to the at least one remote electrical tilt unit, where the first control permission configuration information is used to configure the control permission of the first base station on the at least one remote electrical tilt unit.

In a second possible implementation manner of the fourth aspect, when the permission configuration information includes query permission configuration information, the sending, by the first base station, permission configuration information to the at least one remote electrical tilt unit includes:

sending, by the first base station, the query permission configuration information to the at least one remote electrical tilt unit, where the query permission configuration information is used to configure the query permission of the first base station on the at least one remote electrical tilt unit.

With reference to the first aspect to the second possible implementation manner of the fourth aspect, in a third possible implementation manner of the fourth aspect, when the permission configuration information includes control permission change information, the sending, by the first base station, permission configuration information to the at least one remote electrical tilt unit includes:

if control permission on a first remote electrical tilt unit is allocated to the base station, sending the control permission change information to the first remote electrical tilt unit, where the control permission change information is used to allocate the control permission of the base station on the first remote electrical tilt unit to a second base station, and change the control permission of the base station on the remote electrical tilt unit to the query permission.

With reference to the first aspect to the second possible implementation manner of the fourth aspect, in a fourth possible implementation manner of the fourth aspect, when the permission configuration information includes control permission release information, the sending, by the first base station, permission configuration information to the at least one remote electrical tilt unit includes:

if control permission on a first remote electrical tilt unit is allocated to the base station, sending the control permission release information to the first remote electrical tilt unit, where the control permission release information is used to change the control permission of the base station on the first remote electrical tilt unit to the query permission.

With reference to the first aspect to the fourth possible implementation manner of the fourth aspect, in a fifth possible implementation manner of the fourth aspect, the permission configuration information is specifically an interface command or a permission configuration file.

According to the remote electrical tilt unit, the base station, and the method for managing a remote electrical tilt antenna that are provided in the embodiments of the present invention, the remote electrical tilt unit is connected to at least one base station through a group of AISG ports of a remote control unit, and receives permission configuration information sent by a first base station through a group of AISG ports of the remote control unit; and configures, according to the permission configuration information, management permission of the first base station on the remote electrical tilt unit, where the management permission includes at least control permission and query permission, and control permission on the remote electrical tilt unit can be allocated to only one base station. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
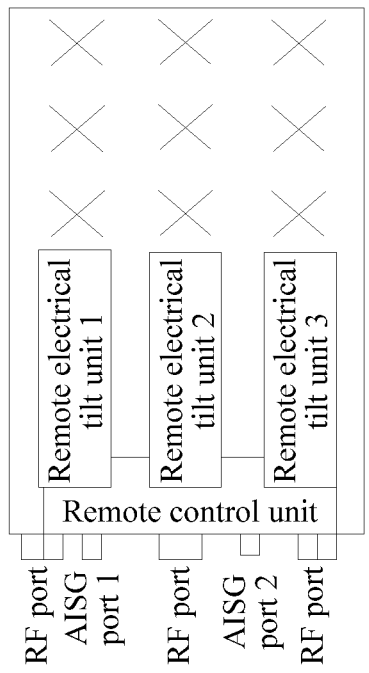
FIG. 1 is a schematic structural diagram of a tri-band antenna device with two AISG ports according to an embodiment of the present invention.
Figure 2:
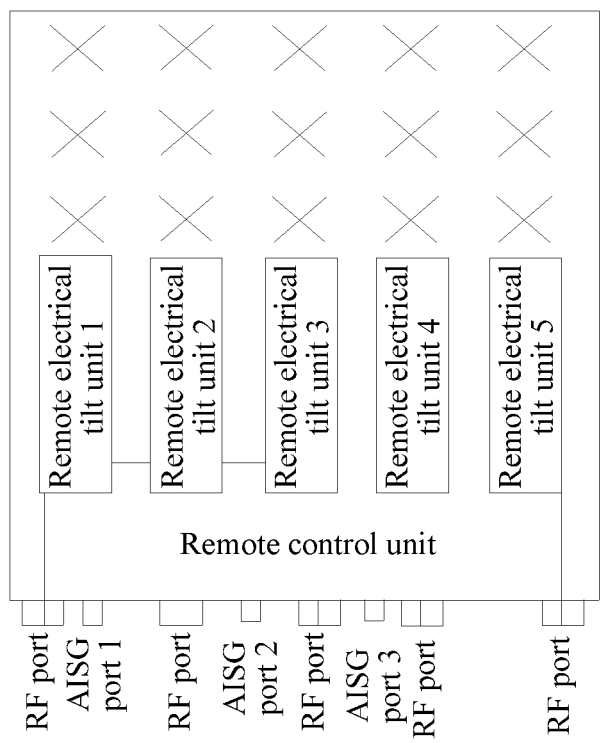
FIG. 2 is a schematic structural diagram of a five-band antenna device with three AISG ports according to another embodiment of the present invention.

In a remote electrical tilt antenna provided by an embodiment of the present invention, a control unit is built in the antenna, at least two groups of AISG ports are provided externally to function as control ports of remote electrical tilt units, where each group of ports provides a same function. Multiple remote electrical tilt units are disposed inside the remote electrical tilt antenna, and the multiple remote electrical tilt units share one control unit. For example, the remote electrical tilt antenna device provided by the embodiment of the present invention may be a tri-band antenna with two AISG ports shown in FIG. 1, where the tri-band antenna with two AISG ports presents two AISG ports and three remote electrical tilt units externally; or the remote electrical tilt antenna device provided by the embodiment of the present invention may be a five-band antenna with three AISG ports shown in FIG. 2, where the five-band antenna with three AISG ports presents three groups of AISG ports and five remote electrical tilt units externally. The remote electrical tilt antenna device provided by the embodiment of the present invention is not limited thereto. The following describes the remote electrical tilt unit in the remote electrical tilt antenna device provided in the embodiment of the present invention.

Figure 3:
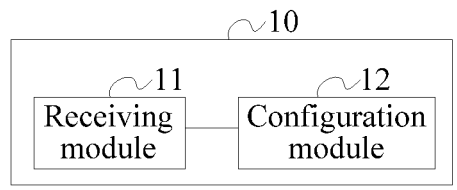
FIG. 3 is a schematic structural diagram of Embodiment 1 of a remote electrical tilt unit according to the present invention.

FIG. 3 is a schematic structural diagram of Embodiment 1 of a remote electrical tilt unit according to the present invention. As shown in FIG. 3, a remote electrical tilt unit 10 provided in this embodiment may include a receiving module 11 and a configuration module 12; the receiving module 11 may be configured to receive, through a group of AISG ports of a remote control unit, permission configuration information sent by a first base station; the configuration module 12 may be configured to configure, according to the permission configuration information received by the receiving module 11, management permission of the first base station on the remote electrical tilt unit, where the management permission includes at least control permission and query permission, and control permission on the remote electrical tilt unit can be allocated to only one base station. This embodiment is not limited thereto.

Optionally, the permission configuration information may include control permission configuration information. Correspondingly, the receiving module 11 may be specifically configured to receive first control permission configuration information sent by the first base station through the group of AISG ports of the remote control unit. The configuration module 12 may be specifically configured to notify the first base station of a control permission conflict if the control permission on the remote electrical tilt unit is allocated to one base station; or, allocate the control permission on the remote electrical tilt unit to the first base station if the control permission on the remote electrical tilt unit is not allocated to any base station.

Optionally, the permission configuration information may include query permission configuration information. Correspondingly, the receiving module 11 may be specifically configured to receive the query permission configuration information sent by the first base station through the group of AISG ports of the remote control unit. The configuration module 12 may be specifically configured to configure the query permission of the first base station on the remote electrical tilt unit according to the query permission configuration information.

It should be noted that, each base station that sets up a physical communication connection with the remote electrical tilt antenna can scan all remote electrical tilt units in the remote electrical tilt antenna, and each remote electrical tilt unit can set up a logical communication connection with each base station. In addition, each remote electrical tilt unit supports multiple types of management permission, where the management permission includes but is not limited to control permission and query permission, and the control permission allows a base station to perform all control and query operation commands on a remote electrical tilt unit. Control permission on each remote electrical tilt unit can be allocated to only one base station. If multiple base stations simultaneously request control permission on a remote electrical tilt unit, the remote electrical tilt unit notifies the base stations of a control permission configuration conflict. The query permission only allows a base station to perform an operation of querying information, and does not allow a base station to perform operations such as calibration or downtilt setting on a remote electrical tilt unit. In addition, query permission on each remote electrical tilt unit can be allocated to multiple base stations.

Further, the permission configuration information may further include control permission change information. Correspondingly, the receiving module 11 may be specifically configured to receive the control permission change information sent by the first base station through the group of AISG ports of the remote control unit. The configuration module 12 may be further configured to: if the control permission on the remote electrical tilt unit is allocated to the first base station, allocate the control permission of the first base station on the remote electrical tilt unit to a second base station according to the control permission change information, and change the control permission of the first base station on the remote electrical tilt unit to the query permission according to the control permission change information.

Further, the permission configuration information may further include control permission release information. Correspondingly, the receiving module 11 may be specifically configured to receive the control permission release information sent by the first base station through the group of AISG ports of the remote control unit. The configuration module 12 may be further configured to: if the control permission on the remote electrical tilt unit is allocated to the first base station, change the control permission of the first base station on the remote electrical tilt unit to the query permission according to the control permission release information.

In an actual application, the permission configuration information may be specifically an interface command or a permission configuration file. When a control permission configuration conflict occurs, a user may perform coordination and control the first base station to send permission configuration information to the first base station, to change the control permission of the first base station on the remote electrical tilt unit to the query permission.

According to the technical solution of this embodiment, a remote electrical tilt unit is connected to at least one base station through a group of AISG ports of a remote control unit; receives, through a receiving module of the remote electrical tilt unit, permission configuration information sent by a first base station through a group of AISG ports of the remote control unit; configures, according to the permission configuration information, management permission of the first base station on the remote electrical tilt unit, where the management permission includes at least control permission and query permission, and control permission on the remote electrical tilt unit can be allocated to only one base station. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

Figure 4:
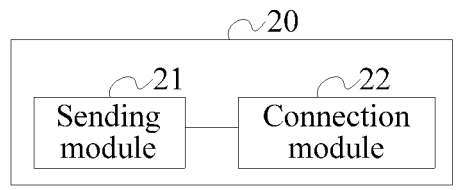
FIG. 4 is a schematic structural diagram of Embodiment 1 of a base station according to the present invention.

FIG. 4 is a schematic structural diagram of Embodiment 1 of a base station according to the present invention. As shown in FIG. 4, the base station 20 provided in this embodiment may include a sending module 21 and a connection module 22, where the connection module 22 is configured to connect to a group of AISG ports of a remote control unit, and establish a connection to at least one remote electrical tilt unit through the AISG ports; and the sending module 21 is configured to send, through the AISG ports, permission configuration information to the at least one remote electrical tilt unit, where the permission configuration information is used to configure management permission of the base station on the remote electrical tilt unit, and the management permission includes at least control permission and query permission.

Optionally, the permission configuration information may include control permission configuration information. Correspondingly, the sending module 21 may be specifically configured to send first control permission configuration information to the at least one remote electrical tilt unit, where the first control permission configuration information is used to configure the control permission of the base station on the at least one remote electrical tilt unit.

Optionally, the permission configuration information includes query permission configuration information. Correspondingly, the sending module 21 may be specifically configured to send the query permission configuration information to the at least one remote electrical tilt unit, where the query permission configuration information is used to configure the query permission of the base station on the at least one remote electrical tilt unit.

In an actual application, the permission configuration information includes control permission change information; the sending module 21 may be further configured to: if control permission on a first remote electrical tilt unit is allocated to the base station, send the control permission change information to the first remote electrical tilt unit, where the control permission change information is used to allocate the control permission of the base station on the first remote electrical tilt unit to a second base station, and change the control permission of the base station on the first remote electrical tilt unit to the query permission.

Alternatively, the permission configuration information includes control permission release information; the sending module 21 may be further configured to: if control permission on a first remote electrical tilt unit is allocated to the base station, send the control permission release information to the first remote electrical tilt unit, where the control permission release information is used to change the control permission of the base station on the first remote electrical tilt unit to the query permission.

The permission configuration information may be specifically an interface command or a permission configuration file.

According to the technical solution of this embodiment, a base station is connected to a group of AISG ports of a remote control unit through a connection module of the base station, where the AISG ports provide a connection to at least one remote electrical tilt unit; a sending module of the base station sends, through the AISG ports, permission configuration information to the at least one remote electrical tilt unit, where the permission configuration information is used to configure management permission of the base station on the remote electrical tilt unit, and the management permission includes at least control permission and query permission. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

Figure 5:
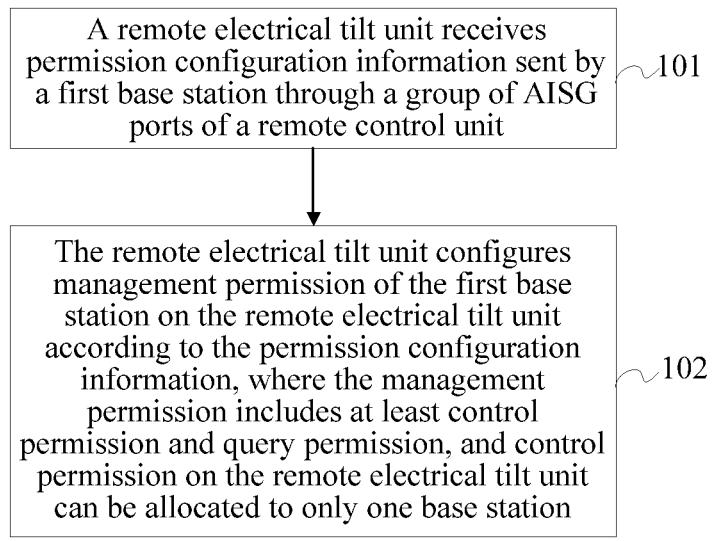
FIG. 5 is a flowchart of Embodiment 1 of a method for managing a remote electrical tilt antenna according to the present invention.

FIG. 5 is a flowchart of Embodiment 1 of a method for managing a remote electrical tilt antenna according to the present invention. As shown in FIG. 5, the method provided in this embodiment may be specifically executed by a remote electrical tilt unit, and the method provided in this embodiment may include:

S101. The remote electrical tilt unit receives permission configuration information sent by a first base station through a group of AISG ports of the remote control unit.

S102. The remote electrical tilt unit configures management permission of the first base station on the remote electrical tilt unit according to the permission configuration information, where the management permission includes at least control permission and query permission, and control permission on the remote electrical tilt unit can be allocated to only one base station.

Optionally, the permission configuration information may include control permission configuration information. Correspondingly, the remote electrical tilt unit receives first control permission configuration information sent by the first base station through the group of AISG ports of the remote control unit.

If the control permission on the remote electrical tilt unit is allocated to one base station, the first base station is notified of a control permission conflict, or if the control permission on the remote electrical tilt unit is not allocated to any base station, the management permission on the remote electrical tilt unit is allocated to the first base station. Alternatively, the permission configuration information includes query permission configuration information, and correspondingly, the remote electrical tilt unit configures the query permission of the first base station on the remote electrical tilt unit according to the query permission configuration information. The permission configuration information may be specifically an interface command or a permission configuration file.

According to the technical solution of this embodiment, a remote electrical tilt unit receives permission configuration information sent by a first base station through a group of AISG ports of a remote control unit; configures, according to the permission configuration information, management permission of the first base station on the remote electrical tilt unit, where the management permission includes at least control permission and query permission, and control permission on the remote electrical tilt unit can be allocated to only one base station. In this way, multiple base stations jointly manage a remote electrical tilt unit in a remote electrical tilt antenna.

Figure 6:
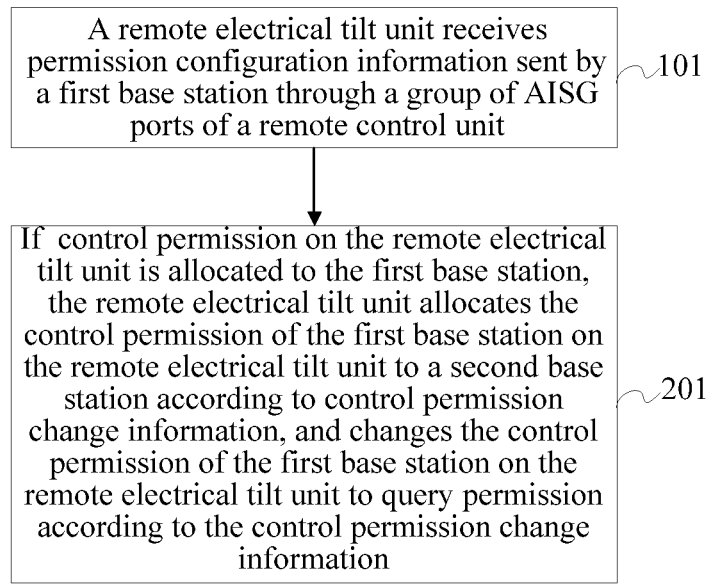
FIG. 6 is a flowchart of Embodiment 2 of a method for managing a remote electrical tilt antenna according to the present invention.

FIG. 6 is a flowchart of Embodiment 2 of a method for managing a remote electrical tilt antenna according to the present invention. As shown in FIG. 6, the permission configuration information includes control permission change information, on the basis of the foregoing embodiment, in the method provided in this embodiment, the foregoing S102 may be as follows:

S201. If the control permission on the remote electrical tilt unit is allocated to the first base station, the remote electrical tilt unit allocates the control permission of the first base station on the remote electrical tilt unit to a second base station, and changes the control permission of the first base station on the remote electrical tilt unit to the query permission according to the control permission change information.

The permission configuration information may be specifically an interface command or a permission configuration file.

According to the technical solution of this embodiment, a remote electrical tilt unit receives permission configuration information sent by a first base station, where the permission configuration information includes control permission change information; if control permission on the remote electrical tilt unit is allocated to the first base station, the remote electrical tilt unit allocates the control permission of the first base station on the remote electrical tilt unit to a second base station, and changes the control permission of the first base station on the remote electrical tilt unit to query permission according to the control permission change information. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

Figure 7:
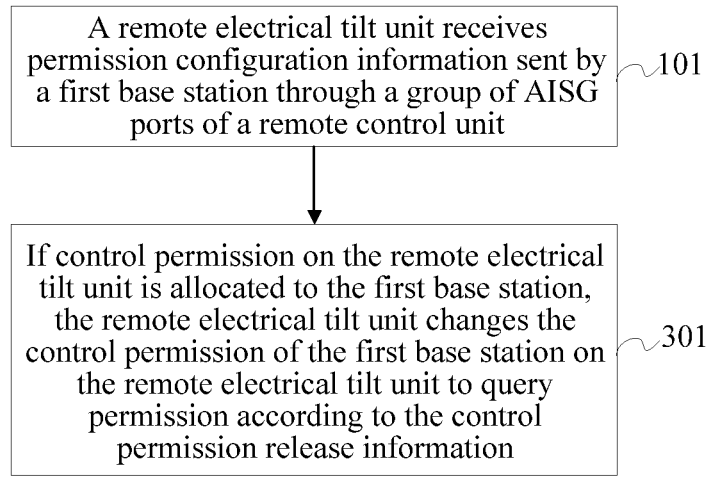
FIG. 7 is a flowchart of Embodiment 3 of a method for managing a remote electrical tilt antenna according to the present invention.

FIG. 7 is a flowchart of Embodiment 3 of a method for managing a remote electrical tilt antenna according to the present invention. As shown in FIG. 7, the permission configuration information includes control permission release information, on the basis of the foregoing embodiment, in the method provided in this embodiment, the foregoing S102 may be as follows:

S301. If the control permission on the remote electrical tilt unit is allocated to the first base station, the remote electrical tilt unit changes the control permission of the first base station on the remote electrical tilt unit to the query permission according to the control permission release information.

In an actual application, when a control permission configuration conflict occurs, a user performs coordination and controls the first base station to send permission configuration information to the remote electrical tilt unit, to change the control permission of the first base station on the remote electrical tilt unit to query permission, and then the user controls a second base station to deliver second control permission configuration information again to the remote electrical tilt unit, to configure control permission by the second base station on the remote electrical tilt unit for the remote electrical tilt unit. The permission configuration information may be specifically an interface command or a permission configuration file.

According to the technical solution of this embodiment, a remote electrical tilt unit receives permission configuration information sent by a first base station, where the permission configuration information includes control permission release information; if control permission on the remote electrical tilt unit is allocated to the first base station, the remote electrical tilt unit changes the control permission of the first base station on the remote electrical tilt unit to query permission according to the control permission release information. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

Figure 8:
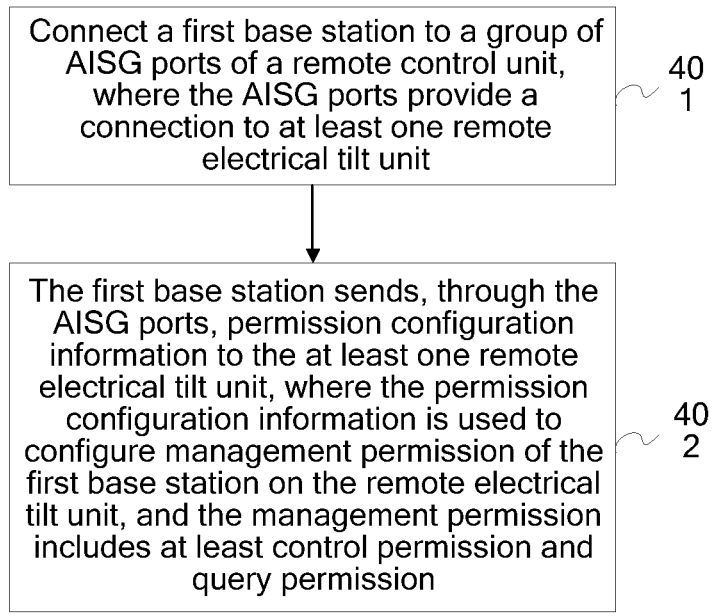
FIG. 8 is a flowchart of Embodiment 4 of a method for managing a remote electrical tilt antenna according to the present invention.

FIG. 8 is a flowchart of Embodiment 4 of a method for managing a remote electrical tilt antenna according to the present invention. As shown in FIG. 8, the method provided in this embodiment may be specifically executed by a base station, and the method provided in this embodiment may include:

S401. Connect a first base station to a group of AISG ports of a remote control unit, where the AISG ports provide a connection to at least one remote electrical tilt unit.

S402. The first base station sends, through the AISG ports, permission configuration information to the at least one remote electrical tilt unit, where the permission configuration information is used to configure management permission of the first base station on the remote electrical tilt unit, and the management permission includes at least control permission and query permission.

It should be noted that, the first base station may send, according to a sequence number of the remote electrical tilt unit, permission configuration information to the remote electrical tilt unit corresponding to the sequence number, where the sequence number may be a sequence number reported by the remote electrical tilt unit as instructed by a scan command delivered by a first base station, or may be configured by working personnel during deployment, which is not limited in this embodiment. A sequence number of a remote electrical tilt unit may include frequency band information of the remote electrical tilt unit. The first base station may learn whether a frequency band of the remote electrical tilt unit and a frequency band used by the first base station are the same according to the sequence number of remote electrical tilt unit. If they are the same, the first base station may send control permission configuration information to the remote electrical tilt unit; if they are different, the first base station may send query permission configuration information to the remote electrical tilt unit. The permission configuration information may be specifically an interface command or a permission configuration file.

Optionally, the permission configuration information includes control permission configuration information. Correspondingly, the first base station may send first control permission configuration information to the at least one remote electrical tilt unit, where the first control permission configuration information is used to configure the control permission of the first base station on the at least one remote electrical tilt unit.

Optionally, the permission configuration information includes query permission configuration information. Correspondingly, the first base station may send the query permission configuration information to the at least one remote electrical tilt unit, where the query permission configuration information is used to configure the query permission of the first base station on the at least one remote electrical tilt unit.

According to the technical solution of this embodiment, a first base station is connected to a group of AISG ports of a remote control unit, where the AISG ports provide a connection with at least one remote electrical tilt unit, and sends permission configuration information to the at least one remote electrical tilt unit. The permission configuration information is used to configure management permission of the first base station on the at least one remote electrical tilt unit, where the management permission includes control permission and query permission. In this way, multiple base stations jointly manage a remote electrical tilt unit in a remote electrical tilt antenna.

Figure 9:
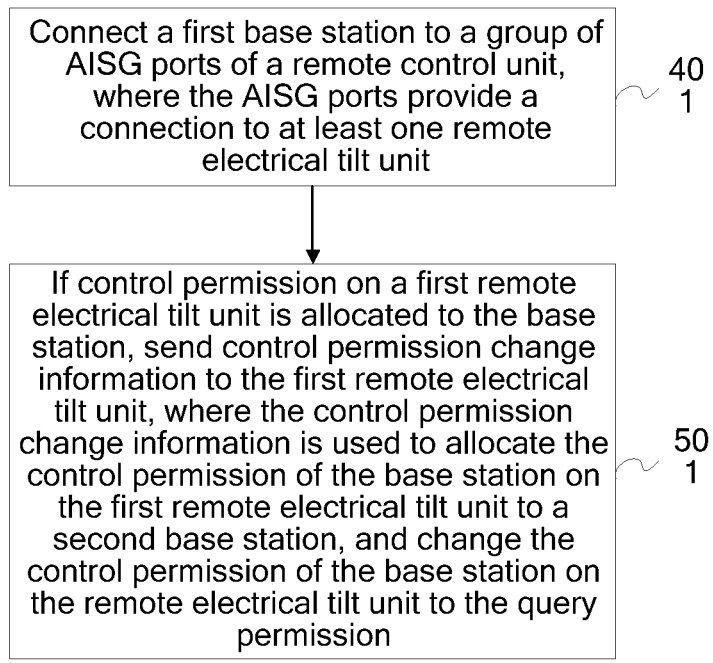
FIG. 9 is a flowchart of Embodiment 5 of a method for managing a remote electrical tilt antenna according to the present invention.

FIG. 9 is a flowchart of Embodiment 5 of a method for managing a remote electrical tilt antenna according to the present invention. As shown in FIG. 9, the permission configuration information may include control permission change information, on the basis of the foregoing embodiment, in the method provided in this embodiment, the foregoing S402 may include:

S501. If control permission on a first remote electrical tilt unit is allocated to the base station, send the control permission change information to the first remote electrical tilt unit, where the control permission change information is used to allocate the control permission of the base station on the first remote electrical tilt unit to a second base station, and change the control permission of the base station on the remote electrical tilt unit to the query permission.

According to the technical solution of this embodiment, a first base station is connected to a group of AISG ports of a remote control unit, where the AISG ports provide a connection with at least one remote electrical tilt unit; if control permission on a first remote electrical tilt unit is allocated to the base station, sends control permission change information to the first remote electrical tilt unit, where the control permission change information is used to allocate the control permission of the base station on the first remote electrical tilt unit to a second base station, and change the control permission of the base station on the remote electrical tilt unit to the query permission. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

Figure 10:
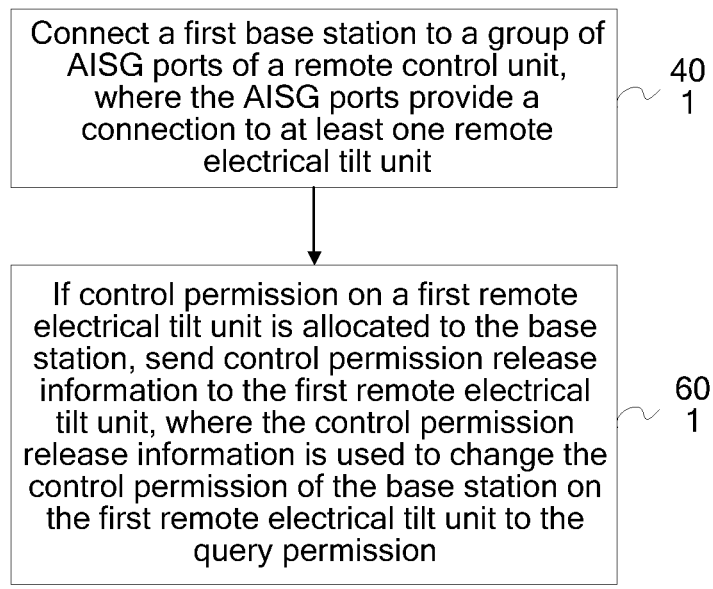
FIG. 10 is a flowchart of Embodiment 6 of a method for managing a remote electrical tilt antenna according to the present invention.

FIG. 10 is a flowchart of Embodiment 6 of a method for managing a remote electrical tilt antenna according to the present invention. As shown in FIG. 10, the permission configuration information includes control permission release information, on the basis of the foregoing embodiment, in the method provided in this embodiment, the foregoing S402 may include:

S601: If control permission on a first remote electrical tilt unit is allocated to the base station, send the control permission release information to the first remote electrical tilt unit, where the control permission release information is used to change the control permission of the base station on the first remote electrical tilt unit to the query permission.

According to the technical solution of this embodiment, a first base station is connected to a group of AISG ports of a remote control unit, where the AISG ports provide a connection with at least one remote electrical tilt unit; if control permission on a first remote electrical tilt unit is allocated to the base station, sends control permission release information to the first remote electrical tilt unit, where the control permission release information is used to change control permission of the base station on the first remote electrical tilt unit to the query permission. In this way, multiple base stations jointly manage a remote electrical tilt unit in a remote electrical tilt antenna, and a problem that it is difficult to locate and troubleshoot a fault when configuration of the remote electrical tilt unit is incorrect is resolved.

In this embodiment, it is assumed that a tri-band built-in remote electrical tilt antenna with two AISG ports includes three remote electrical tilt units, a first base station uses a frequency band corresponding to a first remote electrical tilt unit, a second base station uses frequency bands corresponding to a second remote electrical tilt unit and a third remote electrical tilt unit, the first base station is connected to a first AISG port, and the second base station is connected to a second AISG port.

When permission on a remote electrical tilt unit is configured for the first base station and the second base station, the first base station may use the first AISG port to scan the first remote electrical tilt unit, the second remote electrical tilt unit, and the third remote electrical tilt unit. Because the first base station uses the frequency band corresponding to the first remote electrical tilt unit, the first base station sends permission control configuration information to the first remote electrical tilt unit, to configure permission on the first remote electrical tilt unit to control permission. Similarly, the second base station may use the second AISG port to scan the first remote electrical tilt unit, the second remote electrical tilt unit, and the third remote electrical tilt unit. Because the second base station uses the frequency bands corresponding to the second remote electrical tilt unit and the third remote electrical tilt unit, the second base station may send control permission configuration information to the second remote electrical tilt unit and the third remote electrical tilt unit separately, to configure permission on the second remote electrical tilt unit and the remote electrical tilt unit to control permission. In this way, the first base station and the second base station can normally control desired remote electrical tilt units.

In addition, the first base station may also send query permission configuration information to the second remote electrical tilt unit and the third remote electrical tilt unit through the first AISG port, to configure permission on the second remote electrical tilt unit and the third remote electrical tilt unit to query permission, so that the first base station can query information about the second remote electrical tilt unit and the third remote electrical tilt unit. However, the first base station does not have control permission on the second remote electrical tilt unit and the third remote electrical tilt unit, that is, the first base station cannot perform control operations such as downtilt setting and calibration on the second remote electrical tilt unit and the third remote electrical tilt unit, or affect normal control by the second base station on the second remote electrical tilt unit and the third remote electrical tilt unit. Similarly, the second base station may also use the second AISG port to send query permission configuration information to the first remote electrical tilt unit, to implement query of information about the first remote electrical tilt unit.

Further, if control permission on the second remote electrical tilt unit is allocated to the first base station, control permission on only the third remote electrical tilt unit can be allocated to the second base station.

In a feasible implementation manner, the first base station or the second base station may send permission configuration information that includes control permission change information to the second remote electrical tilt unit, to allocate the control permission on the second remote electrical tilt unit to the second base station and change the control permission of the first base station on the second remote electrical tilt unit to query permission. In this way, the second base station can normally control the second remote electrical tilt unit and the third remote electrical tilt unit.

In another feasible implementation manner, when the second base station desires control permission on the second remote electrical tilt unit or intends to control the second remote electrical tilt unit, the second remote electrical tilt unit sends a permission conflict alarm to the second base station. After receiving the permission conflict alarm, the second base station learns that control permission on the second remote electrical tilt unit is configured for the first base station. Then, a user performs coordination and controls the first base station to send permission configuration information that includes control permission release information to the second remote electrical tilt unit, to release the control permission of the first base station on the second remote electrical tilt unit, and change the control permission of the first base station on the second remote electrical tilt unit to the query permission. After the first base station changes permission of the second remote electrical tilt unit, the second base station sends control permission configuration information to the second remote electrical tilt unit again, to configure permission on the second remote electrical tilt unit to control permission. In this way, the second base station can normally control the second remote electrical tilt unit and the third remote electrical tilt unit.

The technical solution of this embodiment implements joint management by multiple base stations on a remote electrical tilt unit in a remote electrical tilt antenna and resolves a problem that it is difficult to locate and troubleshoot a fault when configuration of the remote electrical tilt unit is incorrect.

In the several embodiments provided in the present invention, it should be understood that the disclosed apparatus and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor (processor) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

It may be clearly understood by a person skilled in the art that, for the purpose of convenient and brief description, division of the foregoing functional modules is taken as an example for illustration. In actual application, the foregoing functions can be allocated to different functional modules and implemented as required, that is, an inner structure of an apparatus is divided into different functional modules to implement all or some of the functions described above. For a detailed working process of the foregoing apparatus, refer to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A remote electrical tilt antenna, comprising:
a control unit shared by a plurality of remote electrical tilt units;
at least two groups of Antenna Interface Standards Group (AISG) ports coupled to the control unit, each of the plurality of remote electrical tilt units connected to at least one base station through a group of AISG ports, and wherein management permission on each of the remote electrical tilt units includes control permission and query permission, and control permission on each of the remote electrical tilt units is allocated to a single base station; wherein each of the remote electrical tilt units is configured to:
receive permission configuration information sent by a first base station through a group of AISG ports of the remote control unit; and
configure, according to the permission configuration information, management permission of the first base station on the remote electrical tilt unit.

2. The remote electrical tilt antenna according to claim 1, wherein:
the permission configuration information comprises control permission configuration information; and
each remote electrical unit is configured to:
receive control permission configuration information sent by the first base station through the group of AISG ports of the control unit, and notify the first base station of a control permission conflict when the control permission on the remote electrical tilt unit is allocated to a second base station, or allocate the control permission on the remote electrical tilt unit to the first base station when the control permission on the remote electrical tilt unit is not allocated.

3. The remote electrical tilt antenna according to claim 1, wherein:
the permission configuration information comprises query permission configuration information; and
each remote electrical tilt unit is configured to:
receive query permission configuration information sent by the first base station through the group of AISG ports of the control unit, and
configure the query permission of the first base station on the remote electrical tilt unit according to the query permission configuration information.

4. The remote electrical tilt antenna according to claim 1, wherein:
the permission configuration information comprises control permission change information; and
each remote electrical tilt unit is configured to:
receive control permission change information sent by the first base station through the group of AISG ports of the control unit, and
when the control permission on the remote electrical tilt unit is allocated to the first base station, allocate the control permission of the first base station on the remote electrical tilt unit to a second base station according to the control permission change information, and change the control permission of the first base station on the remote electrical tilt unit to the query permission according to the control permission change information.

5. The remote electrical tilt antenna according to claim 1, wherein:
the permission configuration information comprises control permission release information; and
each remote electrical tilt unit is configured to:
receive control permission release information sent by the first base station through the group of AISG ports of the control unit, and
when the control permission on the remote electrical tilt unit is allocated to the first base station, change the control permission of the first base station on the remote electrical tilt unit to the query permission according to the control permission release information.

6. The remote electrical tilt antenna according to claim 1, wherein the permission configuration information comprises at least one of an interface command or a permission configuration file.

7. The remote electrical tilt antenna according to claim 1, wherein control operation is configured to be performed when the control permission on the remote electrical tilt unit is allocated to the first base station, wherein the control operation comprises at least one of a downtilt setting on the remote electrical tilt unit or a calibration on the remote electrical tilt unit.

8. A remote electrical tilt antenna, comprising:
a control unit shared by a plurality of remote electrical tilt units;
at least two groups of Antenna Interface Standards Group (AISG) ports coupled to the control unit, each of the plurality of remote electrical tilt units connected to at least one base station through a group of AISG ports, and wherein management permission on each of the remote electrical tilt units includes control permission and query permission, and control permission on each of the remote electrical tilt units is allocated to a single base station, wherein each of the remote electrical tilt units is configured to:
receive permission configuration information sent by a first base station through a group of AISG ports of the remote control unit; and
wherein the permission configuration information comprises at least one of an interface command or a permission configuration file.

9. A remote electrical tilt antenna, comprising:
a control unit shared by a plurality of remote electrical tilt units;
at least two groups of Antenna Interface Standards Group (AISG) ports coupled to the control unit, each of the plurality of remote electrical tilt units connected to at least one base station through a group of AISG ports, and wherein management permission on each of the remote electrical tilt units includes control permission and query permission, and control permission on each of the remote electrical tilt units is allocated to a single base station, wherein each of the remote electrical tilt units is configured to:
receive permission configuration information sent by a first base station through a group of AISG ports of the remote control unit; and
when the control permission on the remote electrical tilt unit is allocated to the first base station, control operation is configured to be performed, the control operation comprising at least one of a downtilt setting on the remote electrical tilt unit or a calibration on the remote electrical tilt unit.

* * * * *